March 10, 1953     A. A. MEDDOCK     2,630,830
FLUID-METERING SHUTOFF VALVE
Filed Dec. 17, 1951
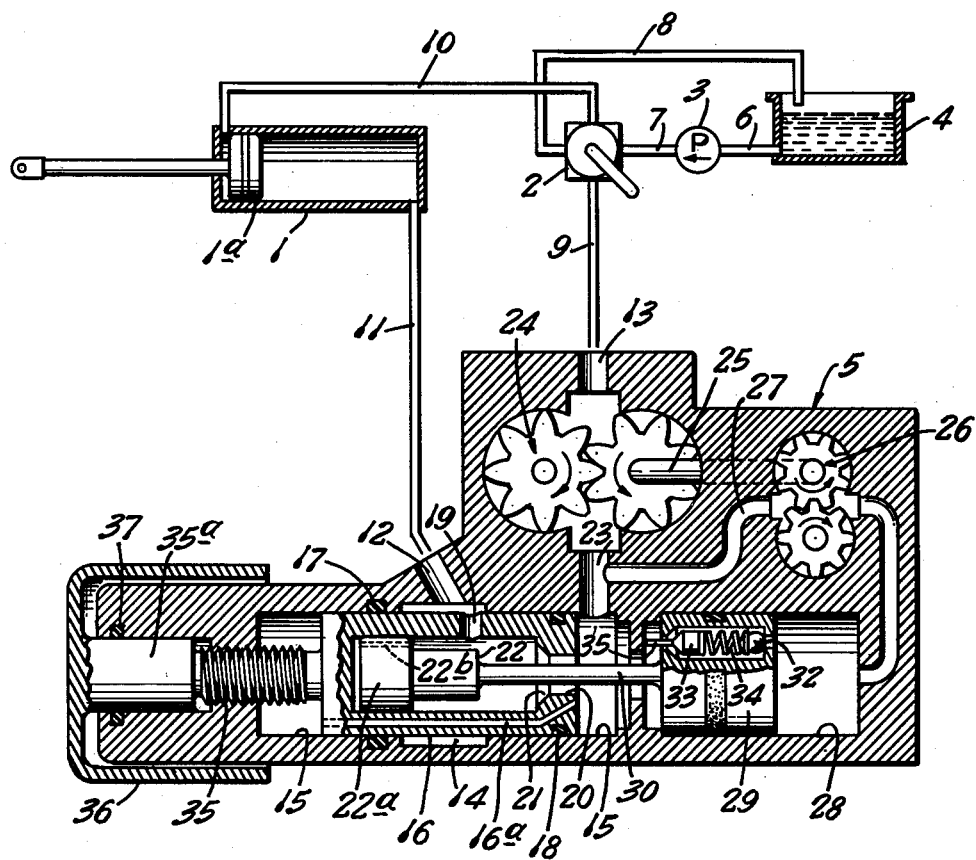
*INVENTOR.*
A. A. Meddock
BY
ATTORNEY Patented Mar. 10, 1953

2,630,830

UNITED STATES PATENT OFFICE 2,630,830

FLUID-METERING SHUTOFF VALVE

Alvin A. Meddock, Van Nuys, Calif., assignor to Bendix Aviation Corporation, North Hollywood, Calif., a corporation of Delaware Application December 17, 1951, Serial No. 261,957

7 Claims. (Cl. 137—643)

This invention relates to flow control valves for blocking a line in response to flow of a predetermined volume of fluid therethrough, and is particularly useful in hydraulic lifts to limit the depth of a plow or other implement.

The present invention is in the nature of an improvement on a valve disclosed in a co-pending application of C. B. Livers and A. A. Meddock, Serial No. 186,664, filed September 25, 1950. That application discloses a valve incorporating a poppet valve in the main flow line and actuated by a piston toward and away from closed position, in combination with means for moving the poppet toward closed position at a rate proportional to the rate of flow in one direction through the main line. The volume of fluid flow required to close the valve can be varied by moving an adjustable stop that limits the distance the poppet can move away from closed position.

The functioning of the prior system is such that if it is desired to change the depth adjustment, the operator has to first re-adjust the stop, and second, raise the implement to its upper limit position, and third, relower the implement.

An object of the present invention is to provide a hydraulic valve of the general type described with reference to the prior application, in which the depth of the implement can be directly increased by manipulation of the depth adjustment without first retracting the implement from the ground.

A feature of the invention is the synchronizing of the valve with the lift motor in both directions, so that if the implement is partially lifted and relowered it will return to the original depth.

Other more specific objects and features of the invention will appear from the description to follow, with reference to the drawing.

The single figure of the drawing is a schematic diagram of a hydraulic system incorporating a valve in accordance with the invention.

Referring to the drawing, the system therein disclosed comprises as its essential elements a motor cylinder 1, a conventional 4-way selector valve 2, a pump 3, a reservoir 4, and a flow-metering shutoff valve 5 in accordance with the present invention.

The pump 3 draws fluid from the reservoir 4 through a line 6, and delivers it through a line 7 to the selector valve 2. This valve has a neutral position in which it connects the pump output line 7 to a return line 8 going back to the reservoir 4. It also has two operating positions on opposite sides of the neutral position. In one operating position, the valve 2 connects the pump output line 7 to a line 9 leading to the valve 5, and connects a line 10 leading from the left end of motor cylinder 1 to the return line 8. The flow path from the line 9 through the valve 5 to the motor line 11 which connects to the right end of the motor 1 is normally open to permit flow of fluid to move the piston 1a of the motor 1, so that the piston continues to move to the left as long as the selector valve is in the said one operating position.

In the other operating position of the selector valve 2, the pump output line 7 is connected to the motor line 10, and the line 9 is connected to the return line 8, so that fluid is delivered from the pump 3 through the line 10, to the left end of the motor cylinder 1, and flows from the right end of the motor cylinder through the line 11 and the valve 5, and then through the line 9, the valve 2, and the return line 8, to the reservoir 4. Movement of the piston 1a to the right continues for a predetermined distance dependent upon the amount of fluid displaced from the right end of cylinder 1, through the line 11 and the valve 5, the latter valve functioning, in response to a predetermined volume of flow therethrough, to block communication between lines 11 and 9, so that the piston 1a is stopped automatically after moving a predetermined distance.

The flow-control valve 5 has a first line port 12 connected to the line 11, and a second line port 13 connected to the line 9. The first port 12 connects with an annular recess 14 intermediate the ends of a cylinder 15 that is formed in the body of the valve 5. This cylinder 15 contains a valve cage 16 in the form of a piston which seals with the cylinder 15 on opposite sides of the annular recess 14, as by means of sealing rings 17 and 18. The valve cake 16 is closed at its left end, but has a lateral port 19 which is in communication with the recess 14 in all longitudinal positions of the valve cage, and has an end orifice 20, the inner edge of which defines a poppet valve seat 21. A poppet 22 is reciprocable within the valve cage 16, into and out of engagement with the seat 21. The poppet 22 is provided with a guide head 22a which is slideable longitudinally within the cage 16. However, this head does not act as a piston and to prevent it from having any such action, longitudinal passages 22b may be provided therein. When the poppet 22 is in open position, as shown, there is an open passageway for flow of fluid from the first port 12 through the annular recess 14, the port 19, and through the valve seat 21, into the right end of the cylinder 15 from whence it can flow through a passage 23, and through a gear motor 24, back to the second port 13.

Flow of fluid from the first port 12 through the gear motor to the second port 13, rotates the gear motor 24 in the direction indicated by the arrows. The gear motor 24 is mechanically coupled, as by the shaft 25, to a gear pump 26 which is interposed in a fluid line 27 extending from the passage 23 to the right end of a cylinder 28 which is aligned with and positioned to the right of the cylinder 15. The cylinder 28 contains a piston 29 which is connected by a stem 30 to the poppet valve 22, so that the poppet valve and the piston 29 move in unison. The piston 29 contains a check valve 32 which permits fluid to flow from right to left therepast, and a check valve 33 which prevents fluid flow from right to left therepast, the two valves 32 and 33 being urged toward their seats by a common spring 34. The check valve 33 has a finger 35 thereon extending beyond the left end of the piston 29 and adapted to contact the end wall of the cylinder 28 when the piston 29 is in its leftmost position, as shown in the drawing. This opens the valve 33 and permits flow of fluid through the piston from the right end thereof to the left end. In all positions of the piston 29 other than the left end position, the valves 32 and 33 cooperate to prevent flow in either direction past the piston.

The system functions as follows: As shown in the drawing, the motor piston 1a has been moved into its leftmost extreme position, and under these conditions the piston 29 and the poppet 22 in valve 5 are in their leftmost positions. Now let it be assumed that the selector valve 2 is manipulated to connect the pump output line 7 to the line 10 leading to the left end of the motor piston 1 to move the latter to the right. This movement can continue for a time because there is a passage for fluid flow from the line 11 through the first port 12, the recess 14, the lateral port 19, through the valve seat 21, the passage 23, the gear motor 24, and the second port 13, to the line 9. This flow of fluid drives the gear motor 24, and since there is very little load on that motor, its rotation is substantially proportional to the volume of fluid that flows through it. This in turn drives the gear pump 26, causing the latter to pump a proportionate volume of fluid from the right end of cylinder 28 and deliver it into the passage 23 from whence it flows into the left end of cylinder 28 to fill the space therein produced by the rightward movement of the piston 29. It will be noted that although initially the valve 33 is open because of contact of the finger 35 with the cylinder end wall, the check valve 32 prevents movement of fluid through the piston from left to right. Therefore the movement of the piston 29 is proportional to the fluid that is displaced. Since the poppet valve 22 moves with the piston 29 it eventually reaches the seat 21 and blocks further fluid flow through the valve 5 from the first port 12 to the second port 13, thereby blocking further rightward movement of the motor piston 1a after it has moved a predetermined distance determined by the rate at which the piston 29 is moved in response to the action of the gear motor 24 and the gear pump 26, and the distance the poppet 22 has to travel before contacting its seat 21.

The position in which the motor piston 1a is stopped can be altered by shifting the position of the valve cage 16 longitudinally in the cylinder 15. To this end, the valve cage is provided with a threaded extension 35 which is threaded through an aperture in the body of the valve and terminates in a cap 36 which can manually be rotated to obtain the desired adjustment. A smooth shaft section 35a is provided beyond the threaded section of the extension 35, and a seal 37 is provided to prevent leakage of fluid past the shaft 35a.

The gear motor 24 has a much larger displacement than gear pump 26, so that even though the motor cylinder 1 is relatively large and has a large fluid displacement, the cylinder 28 in the valve 5 can be relatively small.

By varying the position of the valve cage 16 between its right and left limit positions, the position in which the motor piston 1a is automatically stopped can be adjusted to any point within a wide range.

A particular feature of the present invention is that the use of the movable cage 16 bearing the valve 21 permits movement of the piston 1a to the right an additional distance after it has been once stopped, without first returning the piston to the left end of its stroke and starting a new stroke to the right. It will be apparent that this action is readily obtained, because after the poppet valve 22 has engaged the seat 21 and stopped the motor piston 1a, the seat 21 can be moved to the right by rotation of the cap 36, thereby permitting resumption of flow of fluid past the valve seat 21 until the poppet 22 has again been seated by the piston 29.

The invention has substantial advantage in hydraulic lifts for farm implements since the operator can, while running the implement, say a plow, gradually increase the depth of the implement to the desired value by simply rotating the cap 36. After the desired adjustment is obtained, the plow can be repeatedly retracted (by manipulation of the selector valve 2) and relowered to the same depth as before, without any further attention on the part of the operator. With the usual type of automatic depth stop, if the operator desires to change the depth setting he has to not only change the adjustment on the flow control valve, but then raise the implement and again lower it to produce the desired change in depth.

During movement of the motor piston 1a to the left, the valve piston 29 moves in synchronism therewith a proportionate distance through the major portion of the stroke of the motor piston, but the valve piston bottoms against the left end of cylinder 28 before the motor piston bottoms. The opening of valve 33 then permits fluid to flow past the valve piston 29 while the motor piston 1a completes its stroke. This insures that errors resulting from fluid slippage in the gear motor 24 and gear pump 26 will not be cumulative.

The valve cage 16 is hydraulically balanced to permit its ready adjustment at all times. To this end it is provided with a longitudinal vent passage 16a which connects the right end of the cylinder 15 to the left end, thereby preventing any unbalanced fluid forces that would tend to move the valve cage in one direction or the other. It is also to be noted that although after the poppet 22 has closed against the seat 21, it is held closed by pressure of line fluid acting against the left end of the poppet, there is no force tending to move the cage 16 to the right since an equal and opposite pressure exists against the left end of the valve cage.

Although for the purpose of explaining the invention, a particular embodiment thereof has been shown and described, obvious modifications will occur to a person skilled in the art, and I do not desire to be limited to the exact details shown and described.

I claim:

1. A valve of the type described comprising a body having: first and second line ports; a cylinder containing a piston reciprocable therein; a reversible pump having ports connected to opposite ends of said cylinder; a reversible fluid motor having two ports and mechanically connected to said pump for driving it, one of said motor ports being connected to said second line port; valve means connected between said first line port and the other motor port and comprising a pair of movable elements movable together into closed position and apart into open position; means mechanically coupling said piston to one of said valve elements for moving it, said motor being so sensed relative to said pump that fluid flow through said second passage from said first port to said second port drives said one element to the other element and blocks flow into said first port; stop means limiting the stroke of said one element in direction away from said other element; and adjusting means for shifting said other element to vary the stroke of said one element from said stop means.

2. A valve according to claim 1 in which said one element comprises a poppet valve, and said other element comprises a valve seat.

3. A valve according to claim 2 in which: said valve means comprises a second cylinder in said body, said valve seat comprises a valve cage reciprocable in sealing relation with said second cylinder, and one end of said valve cage defines an orifice constituting said valve seat; and said adjusting means comprising an actuating member extending from said valve cage exterior of said body for longitudinally adjusting the position of said valve cage in said second cylinder.

4. A valve according to claim 3 in which: said second cylinder is aligned with said first cylinder; and said means coupling said piston to said poppet element is a stem extending through said valve seat.

5. A valve according to claim 4 in which: said second cylinder has two flow ports connected respectively to said first line port and said other motor port, one of said flow ports being adjacent that end of the second cylinder nearest said first cylinder, and the other flow port being near the mid-portion of the cylinder; the ends of said valve cage sealing with said second cylinder on opposite sides of said other flow port in all positions of said cage, and the cage having a lateral port communicating with said other flow port.

6. A valve according to claim 5 including passage means intercommunicating opposite ends of said second cylinder for equalizing pressure forces on said valve cage.

7. A valve according to claim 1 including valve means responsive to movement of said one element into its limit position away from said other element for by-passing fluid past said piston.

ALVIN A. MEDDOCK.

No references cited.